US011423759B2

(12) United States Patent
Yang et al.

(10) Patent No.: US 11,423,759 B2
(45) Date of Patent: Aug. 23, 2022

(54) DRIVER-MONITORING SYSTEM

(71) Applicant: Aptiv Technologies Limited, St. Michael (BB)

(72) Inventors: Yang Yang, Troy, MI (US); Douglas L. Welk, Rossville, IN (US)

(73) Assignee: Aptiv Technologies Limited, St. Michael (BB)

( * ) Notice: Subject to any disclaimer, the term of this patent is extended or adjusted under 35 U.S.C. 154(b) by 27 days.

(21) Appl. No.: 17/141,810

(22) Filed: Jan. 5, 2021

(65) Prior Publication Data
US 2021/0209922 A1 Jul. 8, 2021

Related U.S. Application Data

(60) Provisional application No. 62/957,426, filed on Jan. 6, 2020.

(51) Int. Cl.
*G08B 21/06* (2006.01)
*B60W 40/09* (2012.01)
(Continued)

(52) U.S. Cl.
CPC ............. *G08B 21/06* (2013.01); *B60W 40/09* (2013.01); *G05D 1/0061* (2013.01); *B60W 2040/0818* (2013.01)

(58) Field of Classification Search
CPC ................. G08B 21/06; B60W 40/09; B60W 2040/0818; B60W 2420/42;
(Continued)

(56) References Cited

U.S. PATENT DOCUMENTS

2013/0131906 A1* 5/2013 Green ................. G05D 1/0055
701/23
2016/0288709 A1 10/2016 Nespolo et al.
(Continued)

FOREIGN PATENT DOCUMENTS

WO 2018202318 11/2018
WO 2019029832 2/2019

OTHER PUBLICATIONS

Mehler, "Selected Observations Drawn from the AHEAD & AVT Consortia on Human Attention in Modern Driving with & without Automation", Massachusetts Institute of Technology, UNECE Global Forum for Road Traffic Safety (WP.1) & World Forum for the Harmonization of Vehicle Regulations (WP.29), Feb. 18, 2019, 15 pages.
(Continued)

*Primary Examiner* — Ryan W Sherwin
(74) *Attorney, Agent, or Firm* — Sawtooth Patent Group PLLC

(57) ABSTRACT

The techniques of this disclosure relate to a driver-monitoring system. The system includes a controller circuit that receives monitoring data from a driver-monitor sensor that is configured to monitor a driver of a vehicle while the vehicle operates in an autonomous-driving mode. The controller circuit determines a score of one or more driver-supervisory metrics based on the monitoring data, each of the driver-supervisory metrics being indicative of whether the driver is supervising the operation of the vehicle. The controller circuit determines a supervision score based on the score of the driver-supervisory metrics. The supervision score is indicative of whether the driver is ready to resume control of the vehicle. The controller circuit indicates a driver-awareness status on a display in a field of view of the driver based on the supervision score. The system can
(Continued)

improve vehicle safety by alerting the driver when the driver exhibits reduced driver awareness behavior.

20 Claims, 10 Drawing Sheets

(51) Int. Cl.
*G05D 1/00* (2006.01)
*B60W 40/08* (2012.01)

(58) Field of Classification Search
CPC ....... B60W 2540/18; B60W 2540/223; B60W 2540/225; B60W 2540/229; B60W 60/0055; B60W 40/08; B60W 2050/146; B60W 2040/0827; B60W 2040/0881; G05D 1/0061
See application file for complete search history.

(56) References Cited

U.S. PATENT DOCUMENTS

| | | |
|---|---|---|
| 2018/0154903 A1 | 6/2018 | Song |
| 2018/0231976 A1* | 8/2018 | Singh .................... B60W 30/12 |
| 2019/0047417 A1 | 2/2019 | Aoi et al. |
| 2019/0056731 A1* | 2/2019 | Westbrook ........... G05D 1/0214 |
| 2019/0187700 A1* | 6/2019 | Zheng .................. G06F 9/4887 |
| 2021/0078609 A1* | 3/2021 | Barth ................ B60W 60/0057 |

OTHER PUBLICATIONS

Seppelt, et al., "Glass Half-Full: On-Road Glance Metrics Differentiate Crashes from Near-Crashes in the 100-Car Data", Accident Analysis & Prevention, vol. 107, Oct. 2017, pp. 48-62, 2017, 15 pages.

"Extended European Search Report", EP Application No. 21150035.0, dated Jun. 28, 2021, 8 pages.

* cited by examiner

| Driver-Supervisory Metric Score | Driver-Supervisory Metrics | | | | | | | |
|---|---|---|---|---|---|---|---|---|
| | Situational Awareness | Distraction Level | Object-in-Hand | Hands-Off-Steering-Wheel Time | Driver Presence | Driver-Body Position | Driver Sleep-State | Driver-Drowsiness Level |
| | 0 | 0 | 0 | 0 | 0 | 0 | 0 | ✗ |
| | 10 | 10 | ✗ | 10 | ✗ | ✗ | ✗ | 10 |
| | 20 | 20 | ✗ | 20 | ✗ | ✗ | ✗ | 20 |
| | 30 | 30 | ✗ | 30 | ✗ | ✗ | ✗ | 30 |
| | 40 | 40 | ✗ | 40 | ✗ | ✗ | ✗ | 40 |
| | 50 | 50 | ✗ | 50 | ✗ | ✗ | ✗ | 50 |
| | 60 | 60 | ✗ | 60 | ✗ | ✗ | ✗ | 60 |
| | 70 | 70 | ✗ | 70 | ✗ | ✗ | ✗ | 70 |
| | 80 | 80 | ✗ | 80 | ✗ | ✗ | ✗ | 80 |
| | 90 | 90 | ✗ | 90 | ✗ | ✗ | ✗ | 90 |
| | 100 | 100 | 100 | 100 | 100 | 100 | 100 | ✗ |

| SUPERVISION SCORE | DRIVER-SUPERVISORY METRICS ||||||||
|---|---|---|---|---|---|---|---|---|
| | SITUATIONAL AWARENESS | DISTRACTION LEVEL | OBJECT-IN-HAND | HANDS-OFF-STEERING-WHEEL TIME | DRIVER PRESENCE | DRIVER-BODY POSITION | DRIVER SLEEP-STATE | DRIVER-DROWSINESS LEVEL |
| 0 | 0 | 0 | 0 | 0 | 0 | 0 | 0 | ▨ |
| | 10 | 10 | ▨ | 10 | ▨ | ▨ | ▨ | 10 |
| | 20 | 20 | ▨ | 20 | ▨ | ▨ | ▨ | 20 |
| | 30 | 30 | ▨ | 30 | ▨ | ▨ | ▨ | 30 |
| | 40 | 40 | ▨ | 40 | ▨ | ▨ | ▨ | 40 |
| | 50 | 50 | ▨ | 50 | ▨ | ▨ | ▨ | 50 |
| | 60 | 60 | ▨ | 60 | ▨ | ▨ | ▨ | 60 |
| | 70 | 70 | ▨ | 70 | ▨ | ▨ | ▨ | 70 |
| | 80 | 80 | ▨ | 80 | ▨ | ▨ | ▨ | 80 |
| | 90 | 90 | ▨ | 90 | ▨ | ▨ | ▨ | 90 |
| | 100 | 100 | 100 | 100 | 100 | 100 | 100 | ▨ |

FIG. 5

| SUPERVISION SCORE | DRIVER-SUPERVISORY METRICS 118 | | | | | | | |
|---|---|---|---|---|---|---|---|---|
| | SITUATIONAL AWARENESS | DISTRACTION LEVEL | OBJECT-IN-HAND | HANDS-OFF-STEERING-WHEEL TIME | DRIVER PRESENCE | DRIVER-BODY POSITION | DRIVER SLEEP-STATE | DRIVER-DROWSINESS LEVEL |
| | 0 | 0 | 0 | 0 | 0 | 0 | 0 | |
| | 10 | 10 | | 10 | | | | 10 |
| | 20 | 20 | | 20 | | | | 20 |
| | 30 | 30 | | 30 | | | | 30 |
| | 40 | 40 | | 40 | | | | 40 |
| 50 | 50 | 50 | | 50 | | | | 50 |
| | 60 | 60 | | 60 | | | | 60 |
| | 70 | 70 | | 70 | | | | 70 |
| | 80 | 80 | | 80 | | | | 80 |
| | 90 | 90 | | 90 | | | | 90 |
| | 100 | 100 | 100 | 100 | 100 | 100 | 100 | |

| SUPERVISION SCORE | DRIVER-SUPERVISORY METRICS | | | | | | | |
|---|---|---|---|---|---|---|---|---|
| | SITUATIONAL AWARENESS | DISTRACTION LEVEL | OBJECT-IN-HAND | HANDS-OFF-STEERING-WHEEL TIME | DRIVER PRESENCE | DRIVER-BODY POSITION | DRIVER SLEEP-STATE | DRIVER-DROWSINESS LEVEL |
| | 0 | 0 | 0 | 0 | 0 | 0 | 0 | ▨ |
| | 10 | 10 | ▨ | 10 | ▨ | ▨ | ▨ | 10 |
| | 20 | 20 | ▨ | 20 | ▨ | ▨ | ▨ | 20 |
| | 30 | 30 | ▨ | 30 | ▨ | ▨ | ▨ | 30 |
| | 40 | 40 | ▨ | 40 | ▨ | ▨ | ▨ | 40 |
| | 50 | 50 | ▨ | 50 | ▨ | ▨ | ▨ | 50 |
| | 60 | 60 | ▨ | 60 | ▨ | ▨ | ▨ | 60 |
| | 70 | 70 | ▨ | 70 | ▨ | ▨ | ▨ | 70 |
| | 80 | 80 | ▨ | 80 | ▨ | ▨ | ▨ | 80 |
| | 90 | 90 | ▨ | 90 | ▨ | ▨ | ▨ | 90 |
| 100 | 100 | 100 | 100 | 100 | 100 | 100 | 100 | ▨ |

FIG. 7

DRIVER-MONITORING SYSTEM

CROSS-REFERENCE TO RELATED APPLICATIONS

This application claims the benefit under 35 U.S.C. 119(e) of U.S. Provisional Application No. 62/957,426 filed Jan. 6, 2020, the disclosure of which is hereby incorporated by reference in its entirety herein.

BACKGROUND

A Society of Automotive Engineers (SAE) Level 2 automated driving system includes driver-assistance features that provide steering, braking, and acceleration assistance, for example, lane centering and adaptive cruise control. Vehicles equipped with Level 2 automated-driving systems require a human driver to be poised to take control of the vehicle in the event the automated-driving system relinquishes control. While the vehicle is operating under Level 2 automated control, the driver is responsible for supervising the automated-driving features and the environment surrounding the vehicle. When an inattentive driver is required to take control back from the automated-driving system, the driver may not react in time to avoid an accident or collision. Some automated-driving systems issue warnings to the inattentive driver when the driver removes their hands from a steering wheel or is looking away from the roadway for a predefined period of time. In some cases, drivers can overcome these monitoring systems by placing an object on the steering wheel to simulate a torque input from the driver's hands or place a photograph in a driver's seat to give an appearance of the driver attentively watching the roadway.

SUMMARY

This document describes one or more aspects of a driver-monitoring system. In one example, the system includes a controller circuit configured to receive monitoring data from a driver-monitor sensor that is configured to monitor a driver of a vehicle while the vehicle operates in an autonomous-driving mode. The controller circuit is also configured to determine a score of one or more driver-supervisory metrics based on the monitoring data, each of the driver-supervisory metrics being at least partially indicative of whether the driver is supervising the operation of the vehicle. The controller circuit is also configured to determine a supervision score based on the score of the one or more driver-supervisory metrics. The supervision score is indicative of whether the driver is ready to resume control of the vehicle. The controller circuit is also configured to indicate a driver-awareness status on a display in a field of view of the driver based on the supervision score.

In another example, a method includes receiving, with a controller circuit, monitoring data from a driver-monitor sensor configured to monitor a driver of a vehicle while the vehicle operates in an autonomous-driving mode. The method also includes determining, with the controller circuit, a score of one or more driver-supervisory metrics based on the monitoring data. The method also includes determining, with the controller circuit, a supervision score based on the score of the one or more driver-supervisory metrics. The method also includes indicating, with the controller circuit, a driver-awareness status on a display in a field of view of the driver based on the supervision score.

This summary is provided to introduce aspects of a driver-monitoring system, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where cameras can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a driver-monitoring system are described in this document with reference to the following drawings. The same numbers are used throughout the drawings to reference like features and components:

FIG. 3 illustrates an example of driver-supervisory metrics of the driver-monitoring system of FIG. 1;

FIG. 5 illustrates an example of a supervision score based on the driver-supervision metric scores;

FIG. 6 illustrates another example of the supervision score based on the driver-supervision metric scores;

FIG. 7 illustrates yet another example of the supervision score based on the driver-supervision metric scores;

DETAILED DESCRIPTION

Overview

The techniques of this disclosure relate to a driver-monitoring system. A controller circuit receives data from in-cabin sensors that detect whether a driver is supervising an automated vehicle operating in an automated-driving mode. The in-cabin sensors detect whether the driver is properly seated in the driver's seat and whether the driver is paying attention to the vehicle surroundings. The system determines a score of several driver-supervisory metrics that indicate whether the driver is supervising the operation of the vehicle. The system determines a supervision score based on the scores of the driver-supervisory metrics indicative of whether the driver is ready to resume control of the vehicle. The system indicates a driver-awareness status on a lighted display based on the supervision score. The lighted display is located in the driver's field of view, and colors illuminated on the display correspond to the driver-awareness status. The controller circuit alerts the driver when the driver is determined to be inattentive by changing the colors of the display and pulsating the light on the display. The controller circuit increases a frequency of the pulsations when the driver's inattentiveness continues over time. The driver-monitoring system can improve vehicle safety by alerting the driver to inattentive behavior when the vehicle is operating in an autonomous-driving mode and enables a smooth handover of control to the driver resulting in an improved user experience.

Example System

Figure 1:
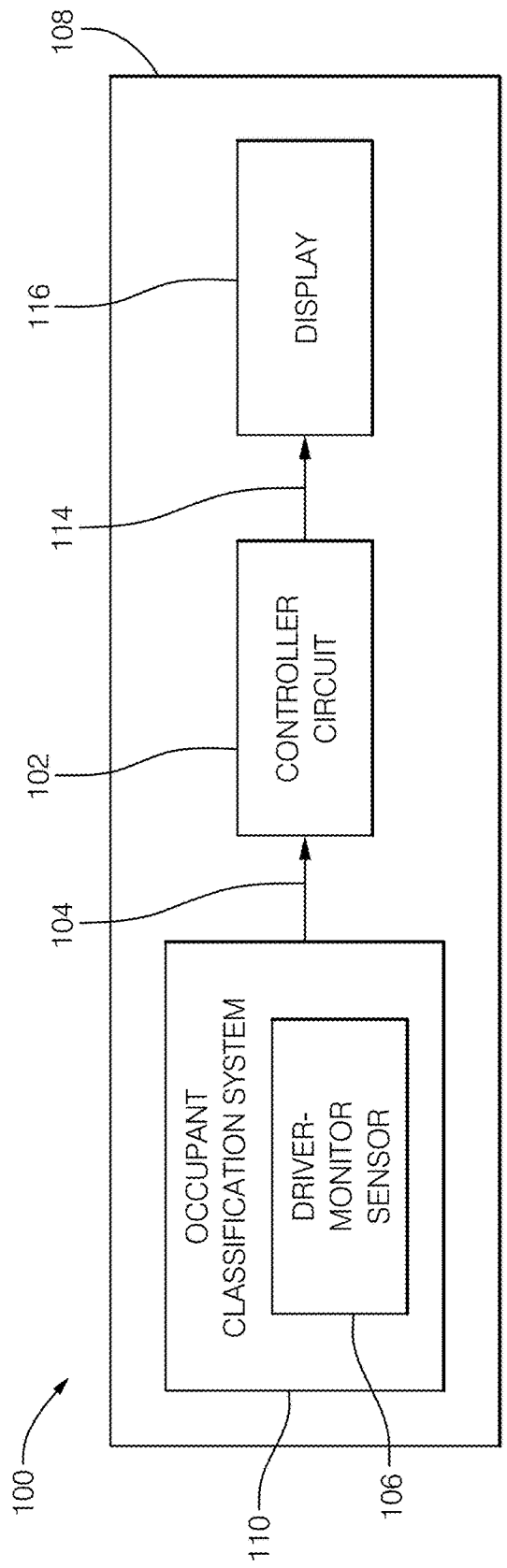
FIG. 1 illustrates an example of a driver-monitoring system mounted on a vehicle.

FIG. 1 illustrates an example of a driver-monitoring system 100, hereafter referred to as the system 100. The system 100 includes a controller circuit 102 configured to receive monitoring data 104 from a driver-monitor sensor 106 installed on a vehicle 108. The driver-monitor sensor 106 can be a component of an occupant classification system 110 (OCS 110) installed on the vehicle 108, which will be explained in more detail below. The controller circuit 102 is configured to determine a supervision score 112 (see FIG. 5) of the driver and indicate a driver-awareness status 114 on a display 116 that is visible in a field of view of the driver.

Although the vehicle 108 can be any vehicle, for ease of description, the vehicle 108 is primarily described as being a self-driving automobile that is configured to operate in an autonomous-driving mode to assist the driver riding onboard the vehicle 108. The vehicle 108 can be capable of a Society of Automotive Engineers (SAE) Level 2 autonomous operation that assists the driver with steering, braking, and acceleration while the driver monitors the operation of the vehicle 108 at all times from a driver's seat.

In the example illustrated in FIG. 1, the controller circuit 102 is installed on the vehicle 108 and is communicatively coupled to the driver-monitor sensor 106 and the display 116 via transmission links. The transmission links can be wired or wireless interfaces, for example, BLUETOOTH®, Wi-Fi®, near field communication (NFC), universal serial bus (USB), universal asynchronous receiver/transmitter (UART), or controller area network (CAN). In some examples, the controller circuit 102 receives data from other vehicle systems via a CAN bus (not shown), for example, an ignition status, a vehicle speed, a vehicle relative motion, and a transmission gear selection.

Controller Circuit

The controller circuit 102 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 102 may also combine custom hard-wired logic, ASICs, or FPGAs with custom programming to perform the techniques. The controller circuit 102 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 102 may include other examples of non-volatile memory, such as flash memory, read-only memory (ROM), programmable read-only memory (PROM), and erasable programmable read-only memory (EPROM). The controller circuit 102 may include volatile memory (e.g., dynamic random-access memory (DRAM), static random-access memory (SRAM)). The controller circuit 102 can include one or more clocks or timers used to synchronize the control circuitry or determine an elapsed time of events. The one or more routines may be executed by the processor to perform steps for determining the supervision score 112 based on signals received by the controller circuit 102 from the driver-monitor sensor 106 as described herein.

Driver-Monitor Sensor

Figure 2:
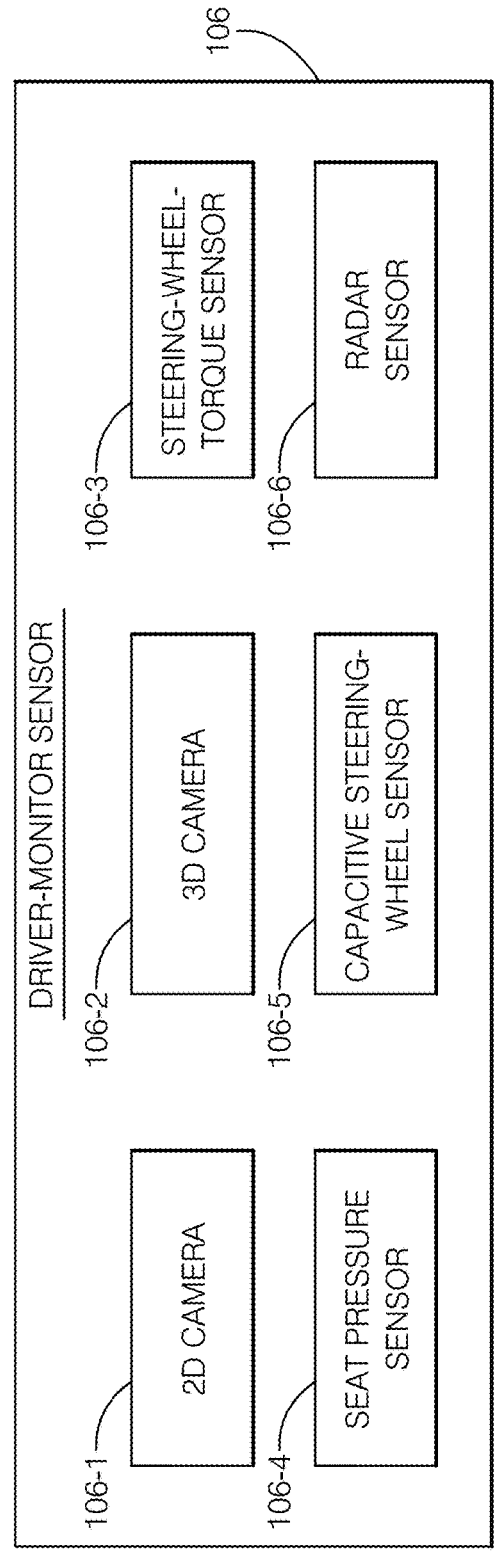
FIG. 2 illustrates an example driver-monitor sensor isolated from the example of a driver-monitoring system of FIG. 1.

FIG. 2 illustrates an example of the driver-monitor sensor 106 that is located remotely from the system 100. The driver-monitor sensor 106 is configured to monitor the driver of the vehicle 108, as will be described in more detail below. The driver-monitor sensor 106 can include one or more sensors that detect aspects of the driver and can be components of the OCS 110 installed on the vehicle 108. The driver-monitor sensor 106 can include a camera that captures images of the driver, and the OCS 110 determines whether the driver's seat is occupied by a person based on the images. Software executed by the OCS 110 can distinguish persons from animals and objects using known image-analysis techniques. The objects in the images are detected in regions of interest that correspond to the seating positions (e.g., the driver's seat position) within the cabin, and the objects are classified by the software into human and other classifications. Processing blocks or models in the software are pre-trained to recognize human forms or shapes of other objects, for example, a shopping bag, a box, or an animal. The camera can be a two-dimensional (2D) camera or a 3D time-of-flight camera that measures a time for light pulses to leave the camera and reflect back on the camera's imaging array.

The OCS 110 can use the images captured by the camera to determine whether the driver is correctly positioned in the driver's seat. The OCS 110 can use known localization techniques to localize a head or upper body of the driver and determine whether the driver is positioned within a zone of the driver's seat. The OCS 110 can include head and body models with known rotations and dynamics within the driver's seat that correspond to normal driving behaviors. The OCS 110 can compare the position of the head and upper body in the images to the head and body models to determine whether the driver is correctly positioned in the driver's seat.

The OCS 110 can use the images captured by the camera to determine the driver's gaze direction, for example, whether the driver is looking at a roadway ahead of the vehicle 108 or looking in other directions. The OCS 110 can use known eye-tracking techniques to determine the gaze direction based on a localization of a pupil of the eyes and a determined head pose. The OCS 110 can keep track of the time that the driver's gaze is fixed in a particular direction (e.g., fixation) and can count a frequency of quick movements of the eyes between different fixated positions (e.g., saccades). The OCS 110 can use the driver's gaze information to indicate a situational-awareness level of the driver, as will be explained in more detail below. In some examples, an infrared (IR) light source is used to illuminate the eyes to enable the localization of the pupils when the driver is wearing glasses or under nighttime conditions.

The OCS 110 can use the images captured by the camera to track the amount of time that the driver's eyes are closed to determine a drowsiness level and a sleep level. The OCS 110 can use eye models to determine whether eyelids are occluding irises of the eyes based on the images captured by the camera. The OCS 110 can determine an amount of openness of the eyelids and a time duration that the eyes are closed as an indication of drowsiness or sleep.

The driver-monitor sensor 106 can also include a seat-pressure sensor that detects a pressure or pressure distribution applied to the seat. The OCS 110 can determine whether the driver is occupying the driver's seat based on a pressure threshold indicative of a weight of the driver. For example, if the weight of the occupant is greater than thirty kilograms, the OCS 110 may determine that the driver is considered an adult. The pressure distribution can indicate whether the object occupying the driver's seat is a person or an object other than a person. The pressure distribution can also indicate whether the driver is in the correct position within the driver's seat; for example, when the driver is leaning over to one side of the seat, the pressure is concentrated on one side of the seat.

The driver-monitor sensor 106 can also include a steering-wheel-torque sensor that detects a torque applied to the steering wheel. The torque can be detected when the driver places a hand on the steering wheel even with the autonomous control system steering the vehicle 108. The steering-wheel-torque sensor can be an electro-mechanical device integrated into a power steering system of the vehicle 108 that determines a torsion bar angle required for the steering movement. The steering-wheel-torque sensor can also output a steering angle and rate of change of the steering wheel angular position.

The driver-monitor sensor 106 can also include a capacitive steering-wheel sensor that detects a touch of the driver's hands on the steering wheel. The capacitive steering-wheel sensors can be located in a rim of the steering wheel and can detect contact points of the hands with the steering wheel. In some examples, touching the steering wheel with the hands distorts an electric field generated by the sensor and changes a capacitance of the sensor, indicating the presence of the driver's hand. The capacitive steering-wheel sensor can detect whether one or both driver's hands are on the steering wheel.

The driver-monitor sensor 106 can also include a radar sensor that detects a presence of objects in the vehicle cabin, and the OCS 110 can determine whether the driver's seat is occupied by the driver or the object based on point cloud data received from the radar sensor. The OCS 110 compares the point cloud data to models in the software to determine whether the seat is occupied by the person or the object. In some examples, the radar sensor can detect relatively small movements, for example, movements of a chest wall of the driver that is breathing.

The monitoring data 104 from the OCS 110 can be periodically updated by the OCS 110 to ensure the controller circuit 102 can accurately determine the supervision score 112. For example, the OCS 110 can update the monitoring data 104 at one-second intervals to account for temporary changes in the seat occupancy or attentiveness of the driver.

The OCS 110 can use machine learning to detect the various driver aspects and behaviors. Machine learning is a data analytics technique that teaches computers to learn from experience. Machine learning routines, or algorithms, use computational methods to learn information from data without relying on a predetermined equation as a model. The routines improve their performance as the sample size available for learning increases. Machine learning uses two types of techniques: supervised learning, which trains a model on known input and output data so that it can predict future outputs, and unsupervised learning, which finds hidden patterns or intrinsic structures in input data. Supervised learning uses classification and regression techniques to develop predictive models. Common algorithms for performing classification include support vector machine (SVM), boosted and bagged decision trees, k-nearest neighbor, Naïve Bayes, discriminant analysis, logistic regression, and neural networks. Common regression algorithms include linear model, nonlinear model, regularization, stepwise regression, boosted and bagged decision trees, neural networks, and adaptive neuro-fuzzy learning. Unsupervised learning finds hidden patterns or intrinsic structures in data and is used to draw inferences from datasets consisting of input data without labeled responses. Clustering is a common unsupervised learning technique. Common algorithms for performing clustering include k-means and k-medoids, hierarchical clustering, Gaussian mixture models, hidden Markov models, self-organizing maps, fuzzy c-means clustering, and subtractive clustering. In the context of self-driving automobiles, the OCS 110 can use machine learning specifically to detect based on the driver-monitor sensor 106 an attentiveness of the driver or other aspects of driving behavior that feed the driver-supervisory metrics 118 to ensure the controller circuit 102 can accurately determine the supervision score 112.

Driver-Supervisory Metrics

FIG. 3 is a table illustrating an example of driver-supervisory metrics 118 that are indicative of whether the driver is supervising the operation of the vehicle. FIG. 3 is not intended to be an exhaustive list of the driver-supervisory metrics 118, as other metrics may be included as defined by the user. The controller circuit 102 can determine a score of driver-supervisory metrics 118 based on the monitoring data 104 received from the OCS 110. The scores of the driver-supervisory metrics 118 can be user-defined, and in the example illustrated in FIG. 3, range from zero to 100, with zero indicating a highest score and 100 indicating a lowest score for the respective metrics. For example, the score of zero for the hands-off-steering-wheel time indicates that the driver's hands are in contact with the steering wheel for most of the time, and the score of 100 indicates that the driver's hands are off the steering wheel for a time greater than a threshold, as will be explained below. Some of the driver-supervisory metrics 118 are binary (e.g., either zero or 100), for example, the driver sleep-state where zero indicates the driver is awake and 100 indicates the driver is asleep.

The driver-supervisory metrics 118 include the situational awareness of the driver that is based in part on a driver's glance direction, a driver's glance duration, and a glance count of the driver, as detected by the camera and determined by the OCS 110. The score of the situational-awareness metric is calculated based on a buffer algorithm developed by the Advanced Human Factors Evaluator for Automotive Demand (AHEAD) Consortium, sponsored by the Massachusetts Institute of Technology (MIT) of Cambridge, Mass., USA, and including members from the automotive and insurance industries and consumer advocacy entities. The buffer algorithm uses an attentional buffer design where the buffer is initially full (e.g., a value of 2.0) and decreases to zero as the driver makes off-road glances. The situational awareness is calculated using the equation (2-Buffer)*50, where the buffer value of 2 indicates a high situational awareness resulting in the driver-supervisory metric score of zero, the buffer value of 1 indicates a cognitive overload resulting in the driver-supervisory metric score of 50, and the buffer value of zero indicates low situational awareness resulting in the driver-supervisory metric score of 100. The buffer algorithm also considers a gaze fixation or vision tunneling, for example, when the driver is looking in a same direction for an extended time. Gaze fixation may be correlated with cognitive workload or mental distraction, and although the driver appears to be looking at the roadway, the attentional buffer may decrease because the driver is not scanning the surroundings for developing traffic situations.

Figure 4:
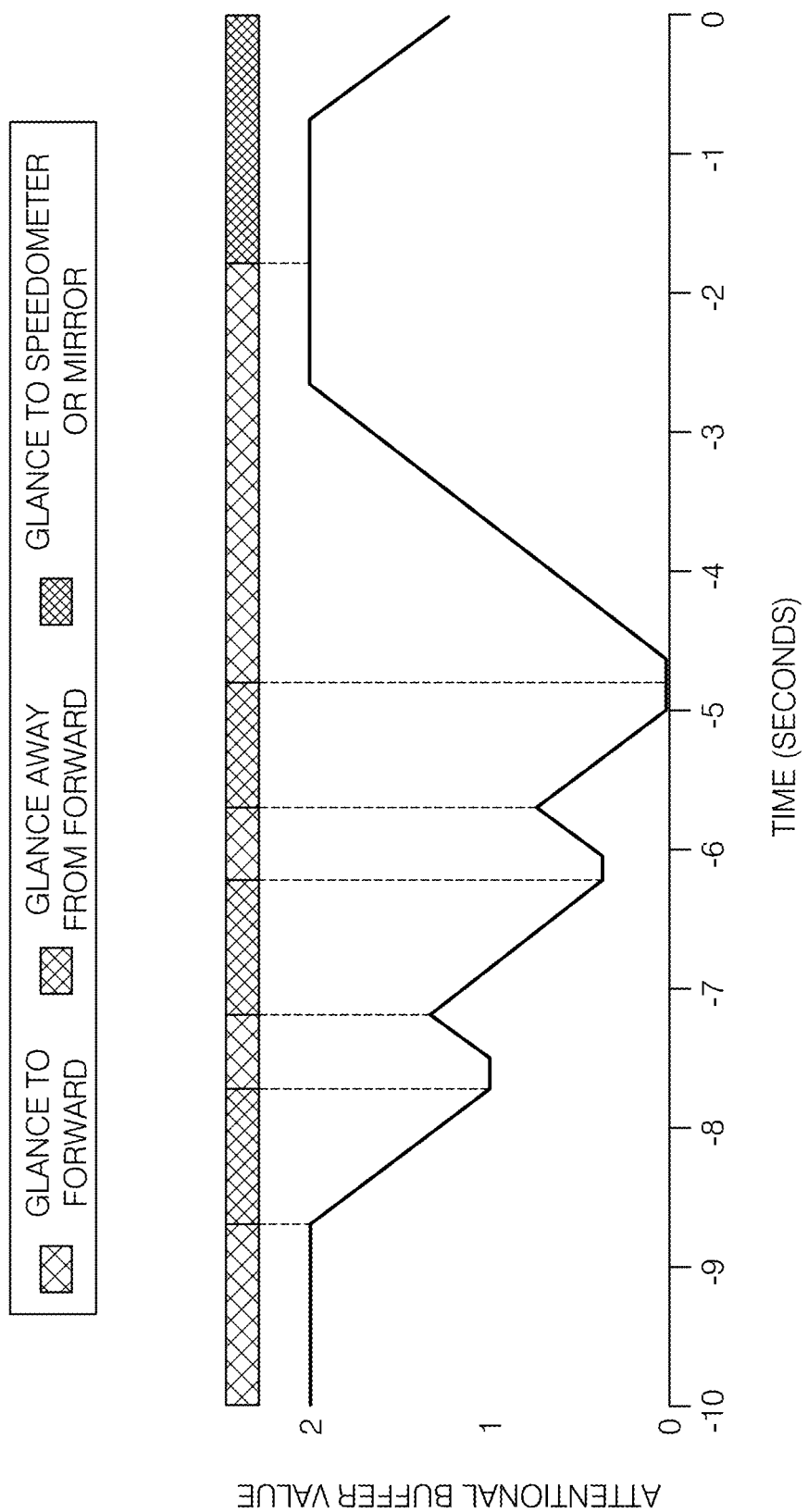
FIG. 4 illustrates an example of an attentional buffer value plot of a situational awareness driver-supervisory metric.

FIG. 4 illustrates an example of the attentional buffer changing over time as the driver glances in different directions for different periods of time, as determined by the OCS 110. The buffer starts at a value of 2 at 10 seconds and decreases to the value of 1 when the driver glances away from a forward direction between 9 seconds and 8 seconds. The driver glances back to forward between 8 seconds and 7 seconds, where the buffer increases to about 1.25. The driver continues to glance away from forward for longer periods of time, and at 5 seconds, the buffer value is zero indicating the low situational-awareness level. From about 4.5 seconds to 3 seconds, the driver's gaze returns to the forward direction, and the buffer increases back to the maximum value of 2. The buffer algorithm does not penalize the driver for glancing in directions that relate to the surroundings or pertain to the operation of the vehicle 108, as illustrated in FIG. 4 at about 2 seconds, where the driver glances at the vehicle mirror or speedometer and the buffer maintains the maximum value of 2.

Referring back to FIG. 3, the driver-supervisory metrics 118 include a distraction level of the driver that is scored from zero, when the driver is considered not to be distracted, up to 100 when the driver is considered to be distracted. The distraction level can be determined by the controller circuit 102 based on the time that the driver is determined to be looking at the roadway. For example, the OCS 110 can define an on-road area of interest that corresponds to the driver's side of the windshield. When the OCS 110 determines that the driver is not looking at the on-road area of interest for a period of time, the OCS 110 can determine that the driver is distracted. The controller circuit 102 can use the equation MIN(100,100*(EYES-OFF-ROAD-TIME/2000)) to determine the score between zero and 100, where the eyes-off-road time is the time in milliseconds (ms) that the driver is not looking toward the on-road area of interest. The controller circuit 102 can monitor the driver's gaze direction for a maximum duration of 2000 ms (i.e., 2 seconds) whereby the score becomes the maximum value of 100. The distraction level differs from the situational awareness in that it does not consider the glance behavior, only whether the driver is looking in a forward direction toward the windshield.

The driver-supervisory metrics 118 include an object-in-hand detection of the driver that can be detected by the camera and determined by the OCS 110 using known object recognition and classification techniques. For example, the camera can capture the image of the driver holding a mobile phone or a book, and the OCS 110 can determine the identity of the object being held in the driver's hands. The controller circuit 102 can include a library of images of known objects to compare to the object detected in the driver's hand and determine whether to assign the score of zero or 100. For example, the mobile phone or the book may be given a score of 100, while a bottle of water that the driver lifts to drink from may be assigned the score of zero.

The driver-supervisory metrics 118 can include a hands-off-steering-wheel time of the driver that can be determined by the controller circuit 102 using timers in conjunction with the images from the camera or the capacitive steering-wheel sensor. The hands-off-steering-wheel times can be scored from zero to 100 by multiplying the time in seconds that the hands are determined to be off the steering wheel by a factor of 10. For example, a value of zero when the hands are detected off the steering wheel for a time less than a threshold (e.g., less than 1 second), a value of 50 when the hands are determined to be off the steering wheel for a time exceeding another threshold (e.g., greater than 5 seconds), and a value of 100 when the hands are determined to be off the steering wheel for a time exceeding yet another threshold (e.g., greater than 10 seconds). The OCS 110 can determine whether the driver removes their hands from the steering wheel, and the controller circuit 102 can start the timer until the OCS 110 determines the driver's hands have returned to the steering wheel.

The driver-supervisory metrics 118 can include a driver presence. The driver presence can be determined by the OCS 110 using the camera or the seat-pressure sensor, as described above. The driver presence metric is scored as the binary value of either zero when the driver is present in the driver's seat or 100 when the driver is determined not to be present in the driver's seat.

The driver-supervisory metrics 118 can include a driver-body position of the driver. The driver-body position can be determined by the OCS 110 using the camera or the seat-pressure sensor, as described above. The driver-body position metric is scored as the binary value of either zero, when the driver is in position in the driver's seat, or 100, when the driver is determined not to be in position in the driver's seat.

The driver-supervisory metrics 118 can include a driver sleep-state. The driver sleep-state is scored as the binary value of either zero when the driver is awake or 100 when the driver is determined to be asleep. The driver sleep-state can include microsleep events that are temporary periods of sleep that can last from a few microseconds to tens of seconds. Microsleep events can manifest as droopy eyelids, slow eyelid closure, and head nodding. The OCS 110 can detect that the driver is exhibiting microsleep events by monitoring the eyes and the head pose of the driver using the camera as described above. The controller circuit 102 can track the time of the eyelid closures and determine whether the eyelid closures last for a time significantly longer than an eye blink that can indicate sleep or microsleep events.

The driver-supervisory metrics 118 can include a driver-drowsiness level. The driver-drowsiness level is related to the driver sleep-state in that the driver-drowsiness level is part of a continuum of sleep. For example, when the driver sleep-state is zero (e.g., fully awake), the driver is not indicating signs of drowsiness, and when the driver sleep-state is 100 (e.g., asleep), the driver has transitioned from drowsy to asleep. As such, the scores of the driver-drowsiness level illustrated in FIG. 3 do not include zero and 100. The OCS 110 can determine the driver-drowsiness level by monitoring the driver's eyes and head pose, as described above. The scores of driver-drowsiness increases as the counts of occurrences of eyelid closures and head nods increase over a given period. For example, the OCS 110 can determine a percentage of eyelid closure over the pupil (PERCLOS) over time that differentiates slow eyelid closures or droops from eye blinks. As the PERCLOS increases, the driver-drowsiness level score can be scaled from 10 to 90 to correspond with the percentage of time the eyes are occluded over the sampled period of time, as illustrated in FIG. 3.

Supervision Score

FIG. 5. illustrates an example of the supervision score 112 determined by the controller circuit 102 that is based on the scores of the driver-supervisory metrics 118. The supervision score 112 is indicative of whether the driver is ready to resume control of the vehicle 108 if the vehicle system exits autonomous-driving mode or in response to a developing traffic situation that the vehicle system may not anticipate.

The controller circuit 102 can determine the supervision score 112 by determining a maximum value of any one of the driver-supervisory metrics 118. In the example illustrated in FIG. 5, the driver is determined to have the high situational awareness with the score of zero, the hands-off-steering-wheel time less than the first threshold (e.g., less than one second) with the score of zero, the driver is present and in the correct position in the driver's seat with the score of zero, and the driver indicates a high alertness level with the score of zero for the driver sleep-state. The controller circuit 102 selects the driver-supervisory metric 118 with the maximum score, which in this example is zero.

FIG. 6. illustrates another example of the supervision score 112 determined by the controller circuit 102, where the driver is determined to exhibit a cognitive overload with the score of 50 for the situational awareness, as determined by the buffer algorithm described above. In this example, the buffer value is 1, generating the score of (2−1)*50=50. The OCS 110 determines that the hands-off-steering-wheel time greater than 5 seconds with a score of 50, and determines that the driver has a driver-drowsiness level score of 20 based on the PERCLOS, as described above. The scores of the remaining driver-supervisory metrics 118 are zero. In this example, the controller circuit 102 selects the driver-supervisory metric 118 with the maximum score, which is 50.

FIG. 7. illustrates another example of the supervision score 112 determined by the controller circuit 102, where the driver is determined to exhibit low situational awareness with the score of 100, as determined by the buffer algorithm described above. In this example, the buffer value is zero generating the score of (2−0)*50=100. The OCS 110 determines that the hands-off-steering-wheel time greater than 10 seconds with a score of 100, and determines that the driver is not in the driver's seat or out of position, each with scores of 100. The scores of the remaining driver-supervisory metrics 118 are zero. In this example, the controller circuit 102 selects the driver-supervisory metric 118 with the maximum score, which is 100.

The controller circuit 102 can use other techniques to determine the supervision score 112 besides selecting the maximum value of the driver-supervisory metrics 118. For example, the controller circuit 102 can determine an average value of all the driver-supervisory metrics 118 and determine the supervision score 112 based on the average value or can determine a maximum value of the driver-supervisory metrics 118 over a period of time to reduce a variation in the supervision score 112.

The controller circuit 102 can indicate the driver-awareness status 114 based on the supervision score 112 on the display 116 in the field of view of the driver, as described below.

Display

Figure 8:
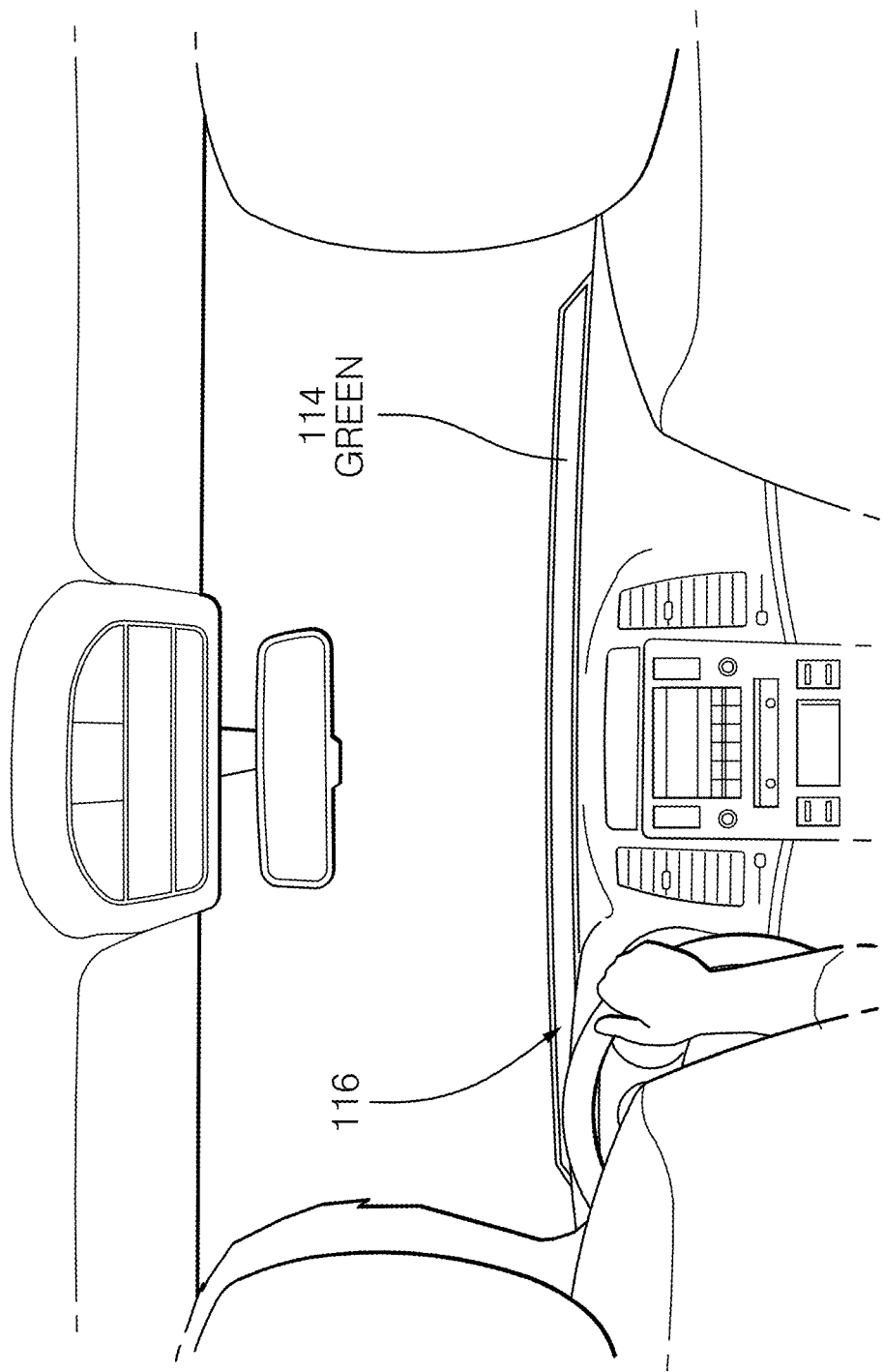
FIG. 8 illustrates an example of a display of the driver-monitoring system of FIG. 1 extending along a dashboard of the vehicle.

FIG. 8 illustrates an example of the display 116 that is a light bar extending along a length of a dashboard located just below the windshield of the vehicle 108. The controller circuit 102 can change a color of light illuminated on the light bar based on the supervision score 112 to indicate the driver-awareness status 114 to the driver, as will be described in more detail below. The light bar can include different light-emitting diodes (LEDs) configured to illuminate different colors of light based on signals received from the controller circuit 102. In the example illustrated in FIG. 8, the controller circuit 102 indicates the driver-awareness status 114 by illuminating a green light on the light bar that corresponds to the supervision score 112 of zero. As the supervision score 112 increases from zero to 100, the controller circuit 102 can indicate the driver-awareness status 114 by changing the color of light on the light bar from green to red, including additional colors that indicate scores between zero and 100.

Figure 9:
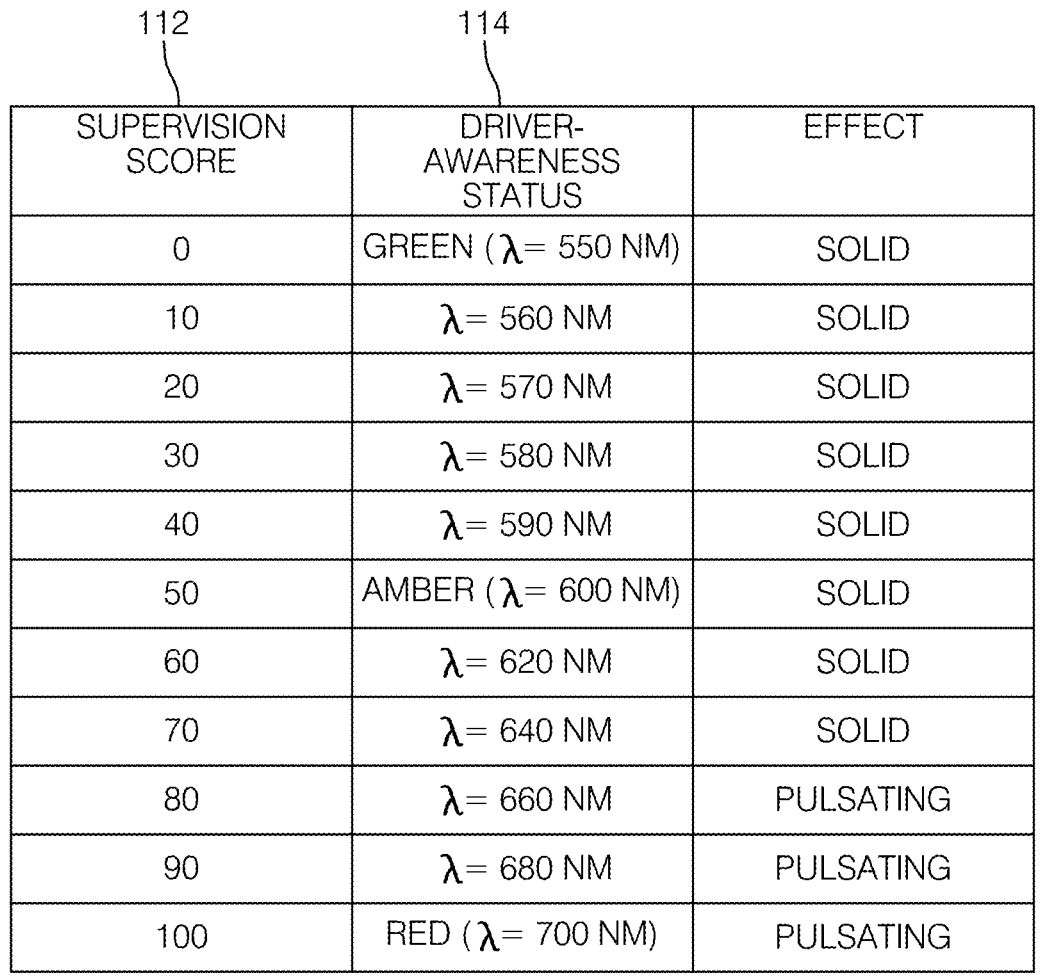
FIG. 9 illustrates an example of the supervision scores and associated colors that can be illuminated on the display of FIG. 8.

FIG. 9 illustrates an example of the supervision scores 112 and associated driver-awareness status 114 ranging from green with a wavelength (λ) of 550 nanometers (nm) to red with the wavelength of 700 nm. Other colors of the visible light spectrum between green and red are indicated by their respective wavelengths. For example, the light having the wavelength of 580 nm is yellow, and the light having the wavelength of 620 nm is orange. The light colors can be predetermined by the vehicle manufacturer or can be selected by the vehicle operator based on the operator's preferences. The driver-awareness status 114 of green indicates that the driver is ready to take control of the vehicle on short notice, and the driver-awareness status 114 of red indicates a serious vehicle safety concern where the driver may not be able to react in time to avoid an accident, should the autonomous-driving mode fail to respond to a threat.

The controller circuit 102 can pulsate the light displayed by the light bar when the supervision score 112 exceeds a first threshold, as indicated in the "EFFECT" column of FIG. 9. The controller circuit 102 can pulsate the light at a first frequency, for example, at two-second intervals or one-half Hertz (0.5 Hz). The first threshold can be user-defined, and in the example illustrated in FIG. 9, the first threshold is the supervision score 112 of 80, where the driver's supervision score 112 indicates that the driver is exhibiting low attentiveness. The controller circuit can increase the frequency of light pulsations when the supervision score exceeds the first threshold for a time exceeding a second threshold. For example, when the supervision score 112 exceeds 80 for a period of 20 seconds, the controller circuit 102 can increase the pulsation frequency of the light from 0.5 Hz to 1 Hz.

Figure 10:
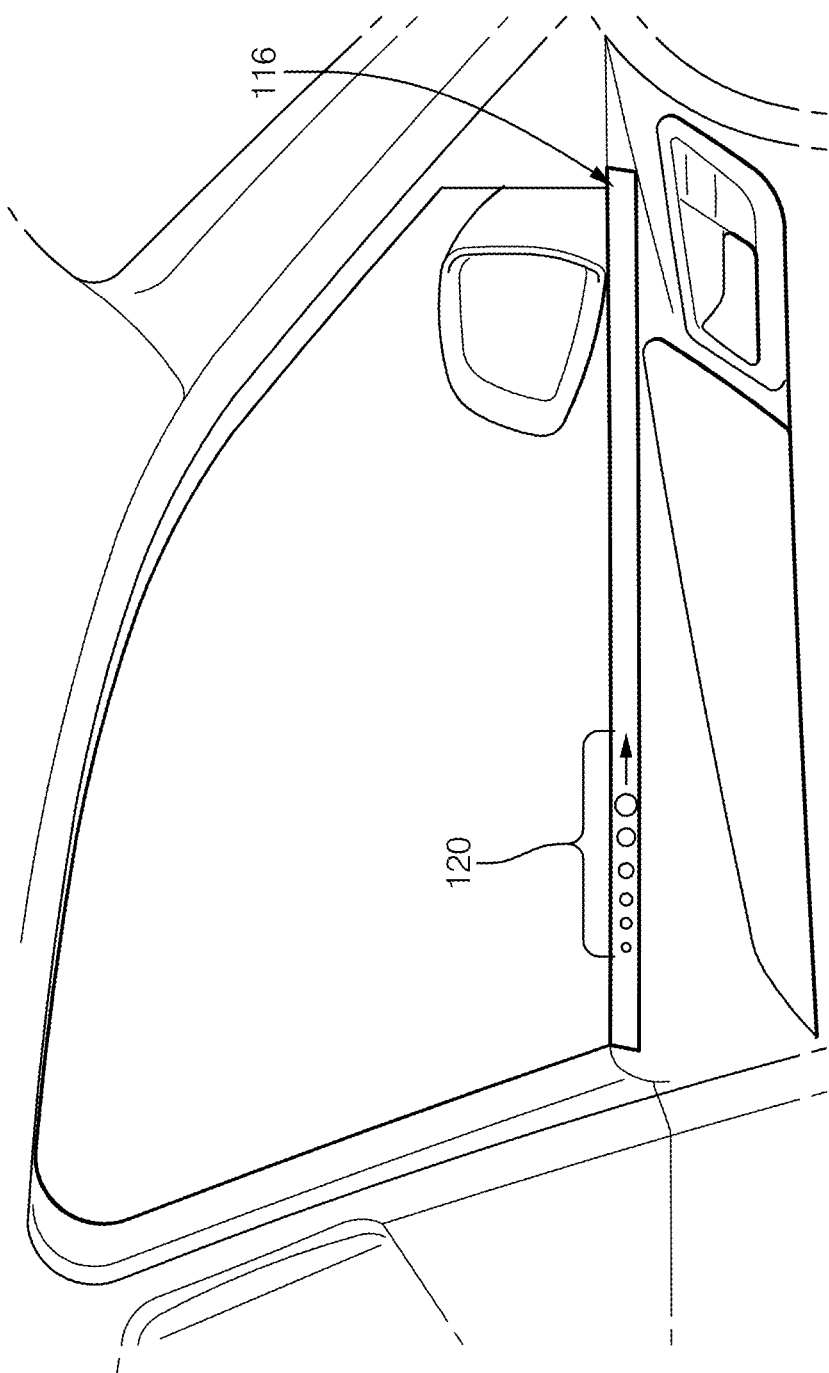
FIG. 10 illustrates an example of the display of the driver-monitoring system of FIG. 1 extending along a door of the vehicle.

FIG. 10 illustrates an example of the light bar extending along the length of a door of the vehicle 108. The light bar can extend along the length of both a left-side and a right-side door of the vehicle 108 that may be in the driver's field of view when the driver is looking to the left or right side of the vehicle 108. The controller circuit 102 can illuminate the door-mounted light bars with the same colors and effects as the light bar located on the dashboard, as described above. The controller circuit 102 can use the monitoring data 104 from the OCS 110 to determine that the gaze direction of the driver is directed toward the left-side or right-side doors and chase 120 the light pulsations on the light bar based on the gaze direction, thereby directing a driver's gaze toward the front of the vehicle 108, as illustrated in FIG. 10. The chase 120 is an electrical application where the adjacent LEDs are cycled on and off to give an illusion that the lights are moving in a particular direction along the light bar. The controller circuit 102 can use different chase patterns to direct the driver's gaze toward the front of the vehicle 108, for example, illuminating progressively larger and larger clusters of LEDs as the chase 120 moves down the light bar or illuminating large sections of LEDs as the chase 120 moves down the light bar.

Figure 11:
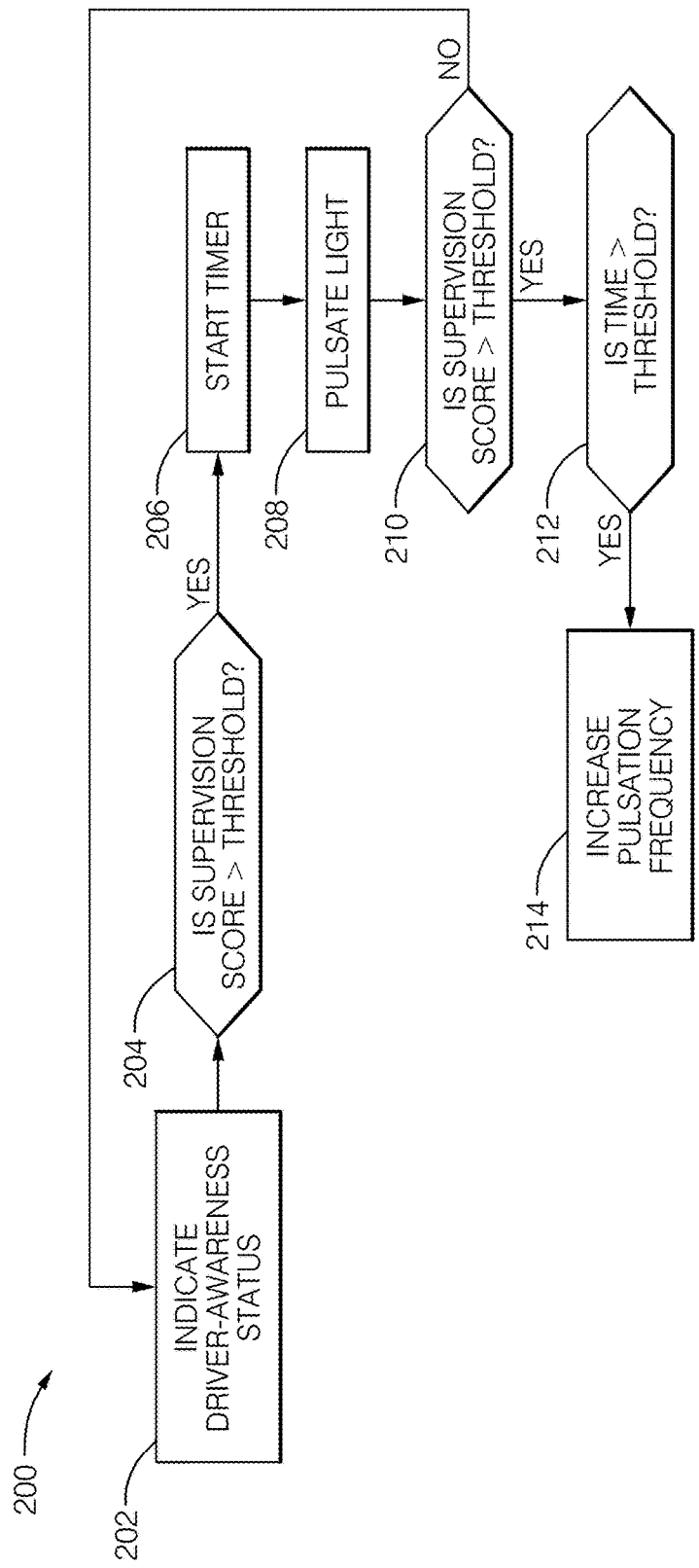
FIG. 11 is an example flow chart of an example logic flow performed by a controller circuit of the system of FIG. 1.
Figure 12:
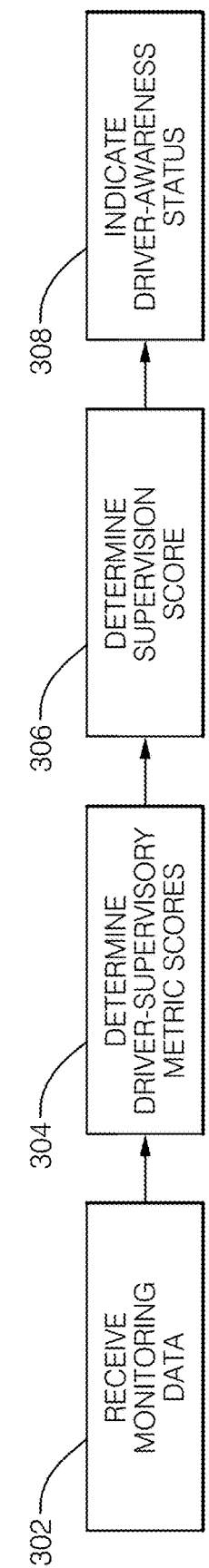
FIG. 12 is an example method of operating the example driver-monitoring system of FIG. 1.

FIG. 11 is a flow diagram illustrating an example logic flow 200 performed by the controller circuit 102. The logic flow starts at 202 with indicating the driver-awareness status 114 on the display 116 upon vehicle ignition and ends at 214 with increasing the pulsation frequency. In this example, at 202, upon the driver actuating a vehicle ignition switch inside the vehicle 108, the controller circuit 102 determines the supervision score 112 based on the scores of the driver-supervisory metrics 118, as described above. The controller circuit 102 indicates the driver-awareness status 114 on the light bar, as illustrated in FIGS. 8-10, and at 204, determines whether the supervision score 112 is greater than a threshold. If the supervision score 112 is greater than the threshold (e.g., greater than 80), at 206, the controller circuit 102 starts the timer.

At 208, the controller circuit 102 begins pulsating the light on the light bar at the first frequency of 0.5 Hz to alert the driver to the degraded driver-attentiveness. At 210, the controller circuit 102 determines whether the supervision score 112 remains greater than the threshold. If the supervision score 112 drops below the threshold, the controller circuit 102 indicates the new driver-awareness status 114 corresponding to the new supervision score 112 on the light bar. If the supervision score 112 remains above the threshold, at 212, the controller circuit 102 determines whether the time is greater than the time threshold (e.g., 20 seconds). When the time exceeds the time threshold of 20 seconds, at 214, the controller circuit 102 increases the frequency of the pulsations to 1 Hz to further alert the driver to the degrading driver-attentiveness.

The controller circuit 102 can use other alert methods in addition to the light color and effects, for example, voice alerts and haptic or vibrational alerts. For example, the voice alerts can call out to the driver to alert the driver to improve their attentiveness. The haptic alerts can be applied to the driver's seat to remind the driver of their supervision responsibilities. These other notification methods can also be escalated by increasing the intensity, for example, by increasing a volume of the voice notification, increasing the frequency of the repeated voice notification, and vibrating the driver's seat with increasing frequency or chasing the seat vibrations toward the front of the vehicle.

Example Method

FIG. 11 illustrates example methods 300 performed by the system 100. For example, the controller circuit 102 configures the system 100 to perform operations 302 through 308 by executing instructions associated with the controller circuit 102. The operations (or steps) 302 through 308 are performed but not necessarily limited to the order or combinations in which the operations are shown herein. Further, any of one or more of the operations may be repeated, combined, or reorganized to provide other operations.

Step 302 includes RECEIVE MONITORING DATA. This can include receiving, with the controller circuit 102, monitoring data 104 from the driver-monitor sensor 106 installed on the vehicle 108 via the transmission link. The driver-monitor sensor 106 can include multiple sensors that detect aspects or behaviors of the driver and can be components of the OCS 110, as described above. The driver-monitor sensor 106 can include 2D cameras and 3D cameras that capture video images of the driver, and the OCS 110 determines whether the seat is occupied by the driver or the object based on the images, as described above. The driver-monitor sensor 106 can also include the radar sensor that detects the presence of the driver in the driver's seat. The OCS 110 can use the cameras to detect the driver's body and head positions and detect the gaze direction of the driver's eyes, as described above. The driver-monitor sensor 106 can also include seat-pressure sensors that detect when the driver is occupying the seat and can include the steering-torque and capacitive steering-wheel sensors to detect whether the driver's hands are on the steering wheel. The monitoring data 104 can be periodically updated by the OCS 110 and transferred to the controller circuit 102 to ensure the controller circuit 102 can accurately determine the supervision score 112.

Step 304 includes DETERMINE DRIVER-SUPERVISORY METRIC SCORES. This can include determining, with the controller circuit 102, scores of the driver-supervisory metrics based on the monitoring data 104 received from the OCS 110. The driver-supervisory metrics include the situational awareness, the distraction level, the object-in-hand detection, the hands-off-steering-wheel time, the driver presence in the driver's seat, the driver-body position in the driver's seat, the driver sleep-state, and the driver-drowsiness level, as illustrated in FIG. 3 and described above.

The controller circuit 102 determines the situational-awareness score based on the driver's glance behavior detected by the camera, as described above. The situational-awareness scores range from zero for high situational awareness to 100 for low situational awareness and are based on the attentional buffer, as described above. The controller circuit 102 determines the distraction level based on the camera detecting the gaze direction of the driver toward the on-road area of interest, as described above. The distraction level scores are zero for the undistracted driver and increase up to 100 for the driver that is looking away from the area of interest for more than 2 seconds, as described above.

The controller circuit 102 determines the object-in-hand detection based on the camera detecting whether the driver is holding a mobile phone or other object that may be an object of the driver's attention. The scores for the object-in-hand are zero for no object-in-hand and 100 when the object is detected in the hand. The controller circuit 102 determines the hands-off-steering-wheel time based on the timer and the steering torque and capacitive steering-wheel sensors. The scores for the hands-off-steering-wheel time range from zero to 100 and are determined by multiplying the time in seconds by 10.

The controller circuit 102 determines whether the driver is present in the driver's seat and whether the driver is positioned correctly in the driver's seat based on the monitoring data 104 from the cameras, radar sensors, and the seat-pressure sensors. The scores for the driver presence are zero for the driver being detected in the driver's seat and 100 for the driver not being detected. The scores for the driver-body position are zero for the driver being in the correct position and 100 for the driver being detected out of position.

The controller circuit 102 determines whether the driver is awake or asleep based on the cameras that detect the eyes and the head pose of the driver, and the amount of time eyelids are closed, as described above. The scores for the driver sleep-state are zero for fully awake and 100 for asleep. The controller circuit 102 determines the driver-drowsiness level based on the driver's eyes and head pose and the PERCLOS as described above. The scores for the driver-drowsiness level range from 10 to 90 and reflect the percentage of time the eyes are occluded, as described above.

Step 306 includes DETERMINE SUPERVISION SCORE. This can include determining, with the controller circuit 102, the supervision score 112 based on the scores of the driver-supervisory metrics 118, as described above. The controller circuit 102 can determine the supervision score 112 based on a maximum value of the driver-supervisory metrics 118 or an average value of the driver-supervisory metrics 118, as described above.

Step 308 includes INDICATE DRIVER-AWARENESS STATUS. This can include indicating, with the controller circuit 102, the driver-awareness status 114 on the light bar, as described above. The driver-awareness status 114 is based on the supervision score 112 and can be displayed by illuminating the light bar with different colors. The light bar can be located in the driver's field of view, for example, extending along the dashboard and doors of the vehicle 108. The controller circuit 102 can change the light color and illumination effects to alert the driver when the controller circuit 102 determines that the supervision score is greater than the threshold indicative of degraded driver-attentiveness, as described above. The controller circuit 102 can pulsate the lights on the light bar to alert the driver and can use voice and vibrational alerts in addition to the lighting effects, as described above. The controller circuit 102 can determine when the driver is looking toward the left and right side of the vehicle and chase 120 the light pulsations displayed on the light bar to direct the driver's attention toward the front of the vehicle, as described above.

EXAMPLES

In the following section, examples are provided.

Example 1

A system, comprising: a controller circuit configured to: receive monitoring data from a driver-monitor sensor that is configured to monitor a driver of a vehicle while the vehicle operates in an autonomous-driving mode; determine a score of one or more driver-supervisory metrics based on the monitoring data, each of the driver-supervisory metrics being at least partially indicative of whether the driver is supervising the operation of the vehicle; determine a supervision score based on the score of the one or more driver-supervisory metrics, the supervision score being indicative of whether the driver is ready to resume control of the vehicle; and indicate a driver-awareness status on a display in a field of view of the driver based on the supervision score.

Example 2

The system of the previous example, wherein the driver-monitor sensor includes one or more of a two-dimensional camera, a three-dimensional camera, a steering torque sensor, and a capacitive steering-wheel sensor.

Example 3

The system of any of the previous examples, wherein the driver-supervisory metrics include one or more of a situational awareness, a distraction level, an object-in-hand detection, a hands-off-steering-wheel time, a driver presence, a driver-body position, a driver sleep-state, and a driver-drowsiness level.

Example 4

The system of any of the previous examples, wherein the controller circuit determines the supervision score by determining a maximum value of any one of the driver-supervisory metrics.

Example 5

The system of any of the previous examples, wherein the situational-awareness metric is based in part on one or more of a driver's glance direction relative to a forward roadway traveled by the vehicle, a driver's glance duration, and a glance count of the driver.

Example 6

The system of any of the previous examples, wherein the controller circuit is further configured to determine a first supervision score that is indicative of the driver having one or more of a high situational awareness, the hands-off-steering-wheel time less than a first threshold, the driver present and in a correct position in a driver's seat, and a high alertness level.

Example 7

The system of any of the previous examples, wherein the controller circuit is further configured to determine a second supervision score that is indicative of the driver having one or more of a cognitive overload and the hands-off-steering-wheel time greater than a second threshold.

Example 8

The system of any of the previous examples, wherein the controller circuit is further configured to determine a third supervision score that is indicative of the driver having one or more of a low situational awareness, the hands-off-steering-wheel time greater than a third threshold, the driver not present or not in a correct position in a driver's seat, and a low alertness level.

Example 9

The system of any of the previous examples, wherein the display comprises a light bar and the controller circuit is further configured to change a color of light displayed based on the supervision score.

Example 10

The system of any of the previous examples, wherein the controller circuit is further configured to pulsate light displayed by the light bar when the supervision score exceeds a first threshold.

Example 11

The system of any of the previous examples, wherein the controller circuit is further configured to increase a frequency of light pulsations when the supervision score exceeds the first threshold for a time exceeding a second threshold.

Example 12

The system of any of the previous examples, wherein the controller circuit is further configured to determine a gaze direction of the driver and chase light pulsations based on the gaze direction, thereby directing a driver's gaze toward a front of the vehicle.

Example 13

The system of any of the previous examples, wherein the light bar extends along a length of a dashboard of the vehicle.

Example 14

The system of any of the previous examples, wherein the light bar further extends along the length of a left-side door and a right-side door of the vehicle.

Example 15

A method, comprising: receiving, with a controller circuit, monitoring data from a driver-monitor sensor configured to monitor a driver of a vehicle; determining, with the controller circuit, a score of one or more driver-supervisory metrics based on the monitoring data; determining, with the controller circuit, a supervision score based on the score of the one or more driver-supervisory metrics; and indicating, with the controller circuit, a driver-awareness status on a display in a field of view of the driver based on the supervision score.

Example 16

The method of the previous example, including determining the supervision score by determining a maximum value of any one of the driver-supervisory metrics.

Example 17

The method of any of the previous examples, wherein the driver-supervisory metrics include one or more of a situational awareness, a distraction level, an object-in-hand detection, a hands-off-steering-wheel time, a driver presence, a driver-body position, a driver sleep-state, and a driver-drowsiness level.

Example 18

The method of any of the previous examples, including determining the supervision score by determining a first supervision score that is indicative of the driver having one or more of a high situational awareness, the hands-off-steering-wheel time less than a first threshold, the driver present and in a correct position in a driver's seat, and a high alertness level.

Example 19

The method of any of the previous examples, including determining the supervision score by determining a second supervision score that is indicative of the driver having one or more of a cognitive overload and the hands-off-steering-wheel time greater than a second threshold.

Example 20

The method of any of the previous examples, including determining the supervision score by determining a third supervision score that is indicative of the driver having one or more of a low situational awareness, the hands-off-steering-wheel time greater than a third threshold, the driver not present or not in a correct position in a driver's seat, and a low alertness level.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system, comprising:
    a controller circuit configured to:
        receive monitoring data from a driver-monitor sensor that is configured to monitor a driver of a vehicle while the vehicle operates in an autonomous-driving mode;
        determine scores for one or more driver-supervisory metrics based on the monitoring data, each of the driver-supervisory metrics being at least partially indicative of whether the driver is supervising the operation of the vehicle;
        determine a supervision score based on the scores for the one or more driver-supervisory metrics, the supervision score being indicative of whether the driver is ready to resume control of the vehicle;
        determine that the supervision score exceeds a first threshold;
        determine a gaze direction of the driver that is not toward a front of the vehicle; and
        cause, based on the supervision score exceeding the first threshold, a chase of light pulsations displayed in a light bar that is disposed in the gaze direction of the driver, the chase of light pulsations comprising adjacent portions of the light bar being lit sequentially towards the front of the vehicle.

2. The system of claim 1, wherein the driver-monitor sensor includes one or more of a two-dimensional camera, a three-dimensional camera, a steering torque sensor, and a capacitive steering-wheel sensor.

3. The system of claim 1, wherein the driver-supervisory metrics include one or more of a situational awareness, a distraction level, an object-in-hand detection, a hands-off-steering-wheel time, a driver presence, a driver-body position, a driver sleep-state, and a driver-drowsiness level.

4. The system of claim 3, wherein the controller circuit determines the supervision score by determining a maximum score of the scores for the driver-supervisory metrics.

5. The system of claim 3, wherein the one or more driver-supervisory metrics are based in part on one or more of a driver's glance direction relative to a forward roadway traveled by the vehicle, a driver's glance duration, and a glance count of the driver.

6. The system of claim 3, wherein the controller circuit is further configured to determine a first value of the supervision score responsive to determining that the driver has one or more of a high situational awareness, the hands-off-steering-wheel time less than a first threshold, the driver present and in a correct position in a driver's seat, and a high alertness level.

7. The system of claim 3, wherein the controller circuit is further configured to determine a second value of the supervision score responsive to determining that the driver has one or more of a cognitive overload and the hands-off-steering-wheel time greater than a second threshold.

8. The system of claim 3, wherein the controller circuit is further configured to determine a third value of the supervision score responsive to determining that the driver has one or more of a low situational awareness, the hands-off-steering-wheel time greater than a third threshold, the driver not present or not in a correct position in a driver's seat, and a low alertness level.

9. The system of claim 1, wherein the controller circuit is further configured to change a color of light displayed by the light bar based on the supervision score.

10. The system of claim 1, wherein the controller circuit is further configured to increase a frequency of the light pulsations responsive to determining that the supervision score has exceeded the first threshold for a predefined time.

11. The system of claim 1, wherein the light bar extends to a dashboard of the vehicle.

12. The system of claim 11, wherein the light bar is disposed along a length of a left-side door or a right-side door of the vehicle.

13. The system of claim 1, wherein the chase of light pulsations is for directing the gaze direction of the driver along the light bar and towards the front of the vehicle.

14. The system of claim 13, wherein causing the chase of light pulsations comprises causing one or more lights of the light bar to appear to move toward the front of the vehicle.

15. A method, comprising:
receiving, by a controller circuit, monitoring data from a driver-monitor sensor configured to monitor a driver of a vehicle while the vehicle operates in an autonomous-driving mode;
determining, by the controller circuit, scores for one or more driver-supervisory metrics based on the monitoring data;
determining, by the controller circuit, a supervision score based on the scores for the one or more driver-supervisory metrics;
determining, by the controller circuit, that the supervision score exceeds a first threshold;
determining, by the controller circuit, a gaze direction of the driver that is not toward a front of the vehicle; and
causing, by the controller circuit and based on the supervision score exceeding the first threshold, a chase of light pulsations displayed in a light bar that is disposed in the gaze direction of the driver, the chase of light pulsations comprising adjacent portions of the light bar being lit sequentially towards the front of the vehicle.

16. The method of claim 15, further comprising determining the supervision score by determining a maximum value of any one of the scores for the driver-supervisory metrics.

17. The method of claim 15, wherein the driver-supervisory metrics include one or more of a situational awareness, a distraction level, an object-in-hand detection, a hands-off-steering-wheel time, a driver presence, a driver-body position, a driver sleep-state, and a driver-drowsiness level.

18. The method of claim 17, further comprising determining a first value of the supervision score responsive to determining that the driver has one or more of a high situational awareness, the hands-off-steering-wheel time less than a first threshold, the driver present and in a correct position in a driver's seat, and a high alertness level.

19. The method of claim 17, further comprising determining a second value of the supervision score responsive to determining that the driver has one or more of a cognitive overload and the hands-off-steering-wheel time greater than a second threshold.

20. The method of claim 17, further comprising determining a third value of the supervision score responsive to determining that the driver has one or more of a low situational awareness, the hands-off-steering-wheel time greater than a third threshold, the driver not present or not in a correct position in a driver's seat, and a low alertness level.

* * * * *